(12) United States Patent
McIninch

(10) Patent No.: US 6,736,578 B2
(45) Date of Patent: May 18, 2004

(54) FRONT MOUNTED RETAINING MECHANISM

(75) Inventor: Rodger McIninch, Little Falls, NJ (US)

(73) Assignee: Accurate Screw Machine Co., Fairfield, NJ (US)

( * ) Notice: Subject to any disclaimer, the term of this patent is extended or adjusted under 35 U.S.C. 154(b) by 0 days.

(21) Appl. No.: 10/153,906

(22) Filed: May 24, 2002

(65) Prior Publication Data

US 2003/0219326 A1 Nov. 27, 2003

(51) Int. Cl.⁷ .................... F16B 21/18; F16B 39/00
(52) U.S. Cl. .................. 411/352; 411/107; 411/178; 411/999
(58) Field of Search .................. 411/107, 178, 411/352, 353, 970, 999, 965

(56) References Cited

U.S. PATENT DOCUMENTS

| | | |
|---|---|---|
| 1,194,169 A | 8/1916 | Greenwood |
| 1,672,879 A | 6/1928 | Campbell, Jr. |
| 2,350,017 A | 5/1944 | Davis |
| 2,400,318 A | 5/1946 | Rosan |
| 2,639,179 A  * | 5/1953 | Phelps ................ 411/178 X |
| 2,922,456 A  * | 1/1960 | Kann ................... 411/999 X |
| 3,041,913 A  * | 7/1962 | Liska ................... 411/999 X |
| 3,195,600 A  * | 7/1965 | Middleton, Jr. ............. 411/352 |
| 3,465,803 A  * | 9/1969 | Ernest et al. ............ 411/999 X |
| 4,043,239 A | 8/1977 | DeFusco |
| 4,387,497 A  * | 6/1983 | Gulistan ................ 411/107 X |
| 4,952,107 A  * | 8/1990 | Dupree ................. 411/107 X |
| 5,118,236 A | 6/1992 | Rodriguez, II et al. |
| 5,232,323 A | 8/1993 | Baehre |
| 5,234,235 A | 8/1993 | Worden |
| 5,487,569 A | 1/1996 | Silvis et al. |

* cited by examiner

Primary Examiner—Neill Wilson
(74) Attorney, Agent, or Firm—Dickstein Shapiro Morin & Oshinsky LLP

(57) ABSTRACT

A front mounted retaining mechanism including a retention device and a captivatable device. The retention device has a head and a hollow shank. The head or the shank may include inwardly directed threads. The shank may include outwardly directed threads to facilitate mounting within a structure. The captivatable device includes a head and a shank, with the shank including a portion having a greater diameter than the remainder of the shank. That portion may be threads or a retainer ring. The captivatable device is threaded into the retention device in such a way as to allow its captivation therein. Then the first structure is aligned with a second structure into which the captivatable device is mounted.

18 Claims, 7 Drawing Sheets

FRONT MOUNTED RETAINING MECHANISM

FIELD OF THE INVENTION

The invention generally relates to fasteners, and more particularly to removable fasteners capable of connecting one structure to another without the use of special tools.

BACKGROUND

Numerous industries require the serial assembly of devices, such as the electronic hardware components industry, the telecommunications industry, the aviation/aerospace industry, and the medical devices industry to name a few. There is often a requirement in these industries for the connection of one structure to another. Conventionally, a retaining mechanism is introduced to one structure. Two types of retainer mechanisms are typically utilized in the electronic hardware components industry for connecting a pair of structures, a flare type 12 (FIG. 1) and a swage type 14 (FIG. 2).

There are several disadvantages to the conventional methods for introducing typically-used retainer mechanisms to a structure. One disadvantage is that the flare and swage type retainer mechanisms 12, 14 are generally capable of being used only once. Their introduction to a structure 10 is permanent. Removal of the retainer mechanism 12, 14 is generally accomplished by drilling it out, destroying the retainer mechanism 12, 14 and possibly damaging the structure 10 into which it has been introduced.

Another disadvantage is that the method of introduction of the retainer mechanism 12, 14 may cause damage to the structure 10. Generally, a punch 20 (FIG. 5), used to introduce the retainer mechanisms 12, 14 to the structure 10, exerts a large force on the structure 10. If the retainer mechanism 12, 14 is introduced too close to an edge of the structure, the force of introduction may cause a crack 16 in the structure 10 or may cause a bulge out 18 (FIGS. 3, 4). Further, the force from the punch 20 used to punch a retainer mechanism 22 (which may be the flare or swage type 12, 14 or other type normally introduced with a punch) may cause the structure 10 to bend (FIG. 5).

Yet another disadvantage is that there may be locations on a structure which are not easily accessible with a punch. For example, a structure 10' (FIG. 6) may include a lip 11, which extends in a direction that inhibits the punch 20 from properly installing the retainer mechanism 22.

SUMMARY

The invention provides a removable front mounted retaining mechanism that includes a retention device adapted for being anchored within a first structure and a captivatable device capable of floating within the retention device in a first position and adapted for being introduced to a second structure in a second position.

The invention also provides a retaining system that includes a first structure having a first opening with a first diameter, a second structure having a second opening with a second diameter that is less than the first diameter, and a removable front mounted retaining mechanism. The removable front mounted retaining mechanism has a retention device adapted for being anchored within the first opening of the first structure and a captivatable device capable of floating within the retention device in a first position and adapted for being introduced to the second opening of the second structure in a second position.

The invention also provides a method of connecting a first structure to a second structure. The method includes the steps of providing a first structure with a first opening having a first diameter, providing a second structure with a second opening having a second diameter smaller than the first diameter of the first opening, introducing a retention device into the first opening of the first structure, introducing a captivatable device into the retention device, said captivatable device being capable of floating within the retention device in a first position, aligning the first opening of the first structure with the second opening of the second structure, and introducing the captivatable device into the second opening of the second structure, thereby connecting the first and second structures.

These and other advantages and features of the invention will be more readily understood from the following detailed description of the invention that is provided in connection with the accompanying drawings.

DETAILED DESCRIPTION OF PREFERRED EMBODIMENTS

Figure 1:
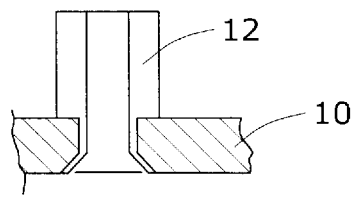
FIG. 1 illustrates a partial cross-sectional view of a conventional flare type of retainer mechanism.
Figure 2:
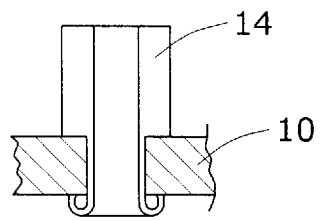
FIG. 2 illustrates a partial cross-sectional view of a conventional swage type of retainer mechanism.
Figure 3:
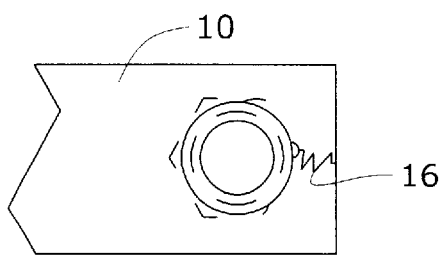
FIG. 3 is a top view of a structure through which a conventional retainer mechanism has been introduced.
Figure 4:
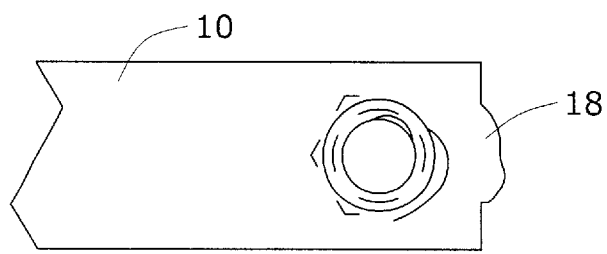
FIG. 4 is another top view of a structure through which a conventional retainer mechanism has been introduced.
Figure 5:
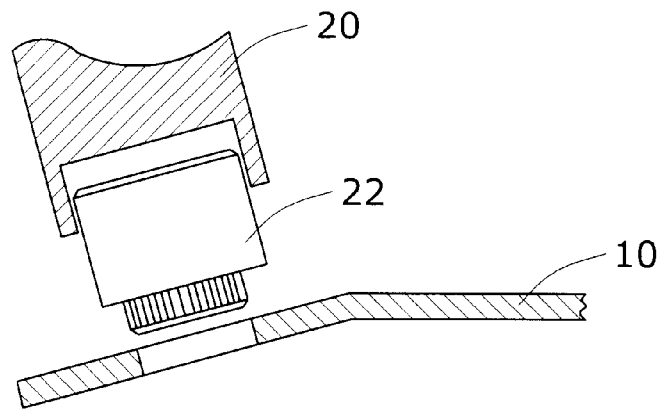
FIG. 5 illustrates a partial cross-sectional view of a punch introducing a conventional retainer mechanism to a structure.
Figure 6:
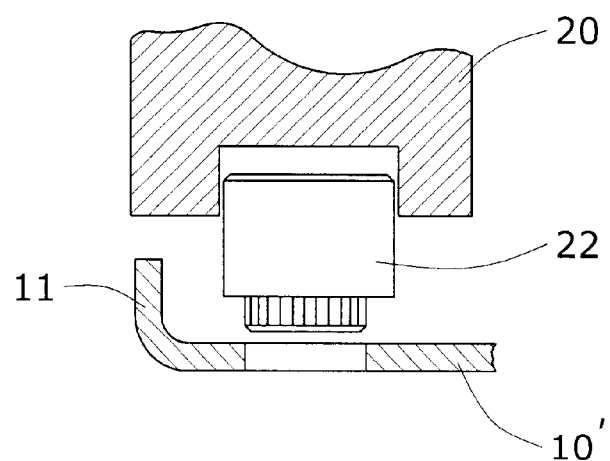
FIG. 6 illustrates a partial cross-sectional view of a punch introducing a conventional retainer mechanism to another structure.
Figure 7:
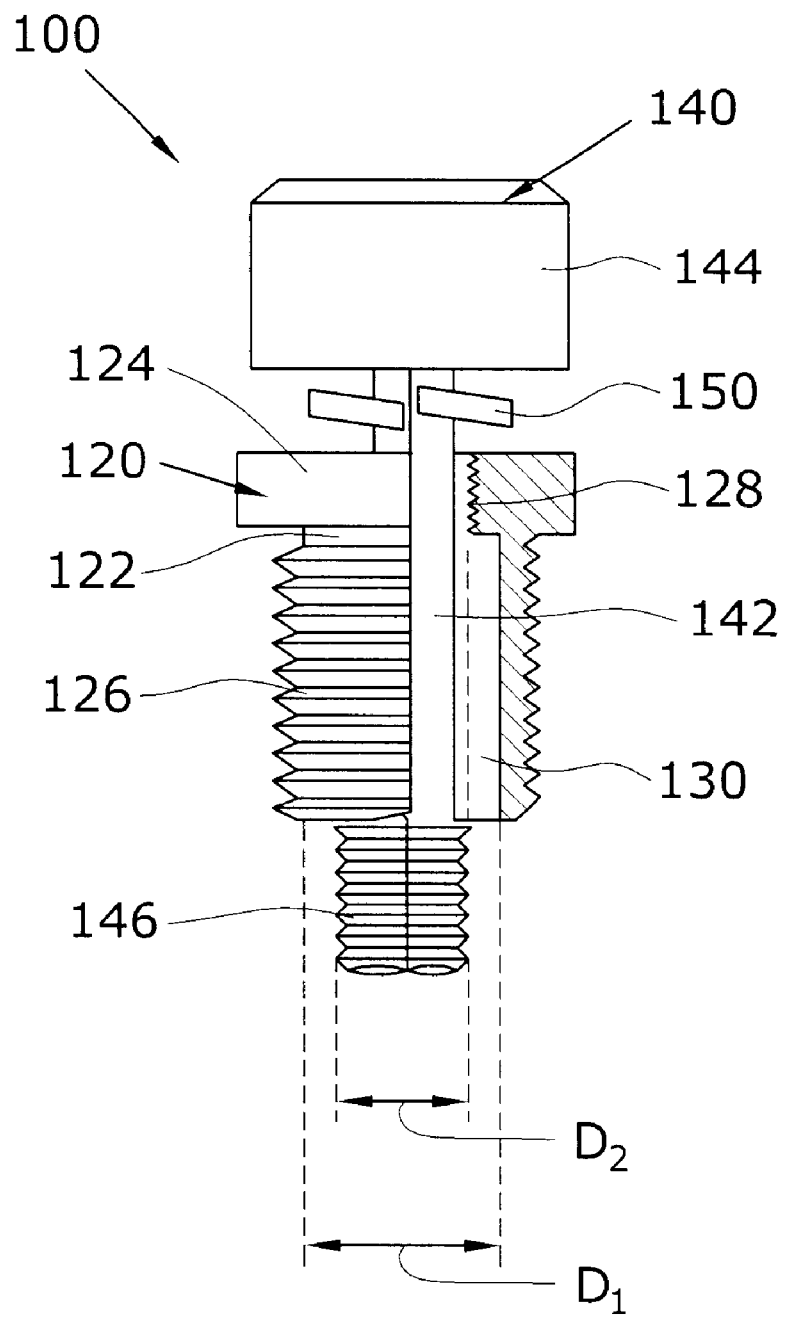
FIG. 7 is a partial cross-sectional view of a retaining mechanism constructed in accordance with an embodiment of the invention.

With specific reference to FIG. 7, in which like reference numerals refer to like elements, a front mounted retaining mechanism 100 is illustrated. The front mounted retaining mechanism 100 includes a retention device 120 and a captivatable device 140.

The retention device 120 includes a shank 122 and a head 124. Outwardly directed threads 126 are provided on the shank 122. The retention device head 124 includes an inwardly directed threaded bore 128. A bore 130 extends through the shank 122 and has a first diameter $D_1$. The threaded bore 128 has a second diameter $D_2$ which is less than the diameter $D_1$. The retention device 120 may take any form suitable for being introduced to a structure and to accept another structure, such as, for example, a bolt with internal threads.

The captivatable device 140 has a shank 142 extending from a head 144. The head 144, as illustrated, has a greater diameter than the shank 142. At the end of the shank 142 opposite from the head 144 are provided externally directed threads 146 having a sufficient diameter and thread width and pitch to engage with the threaded bore 128. An optional retaining washer 150, as illustrated, may be included with the retention device 120 and the captivatable device 140. The captivatable device 140 may take any suitable form, such as a slotted or cross slotted (cruciform) screw.

Figure 8:
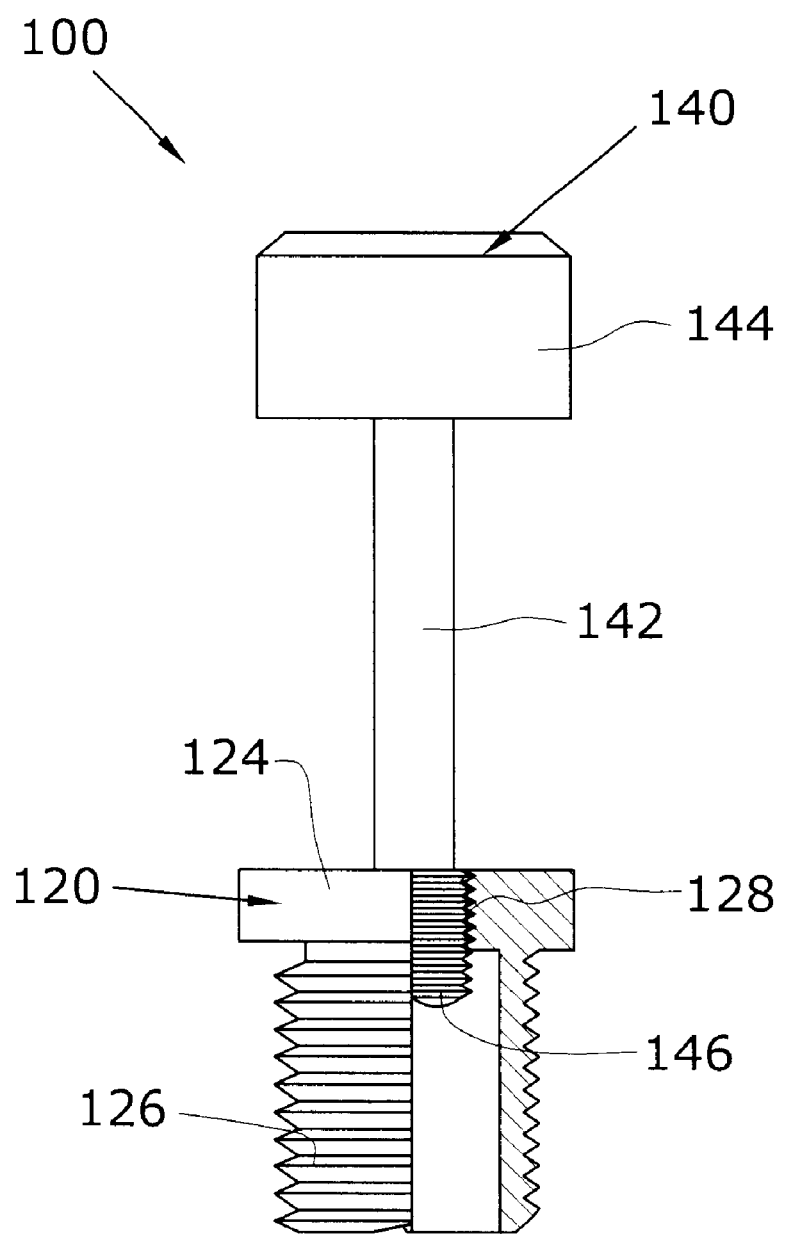
FIG. 8 is a partial cross-sectional view of the retaining mechanism of FIG. 7 showing a captivatable device in an installation state.
Figure 9:
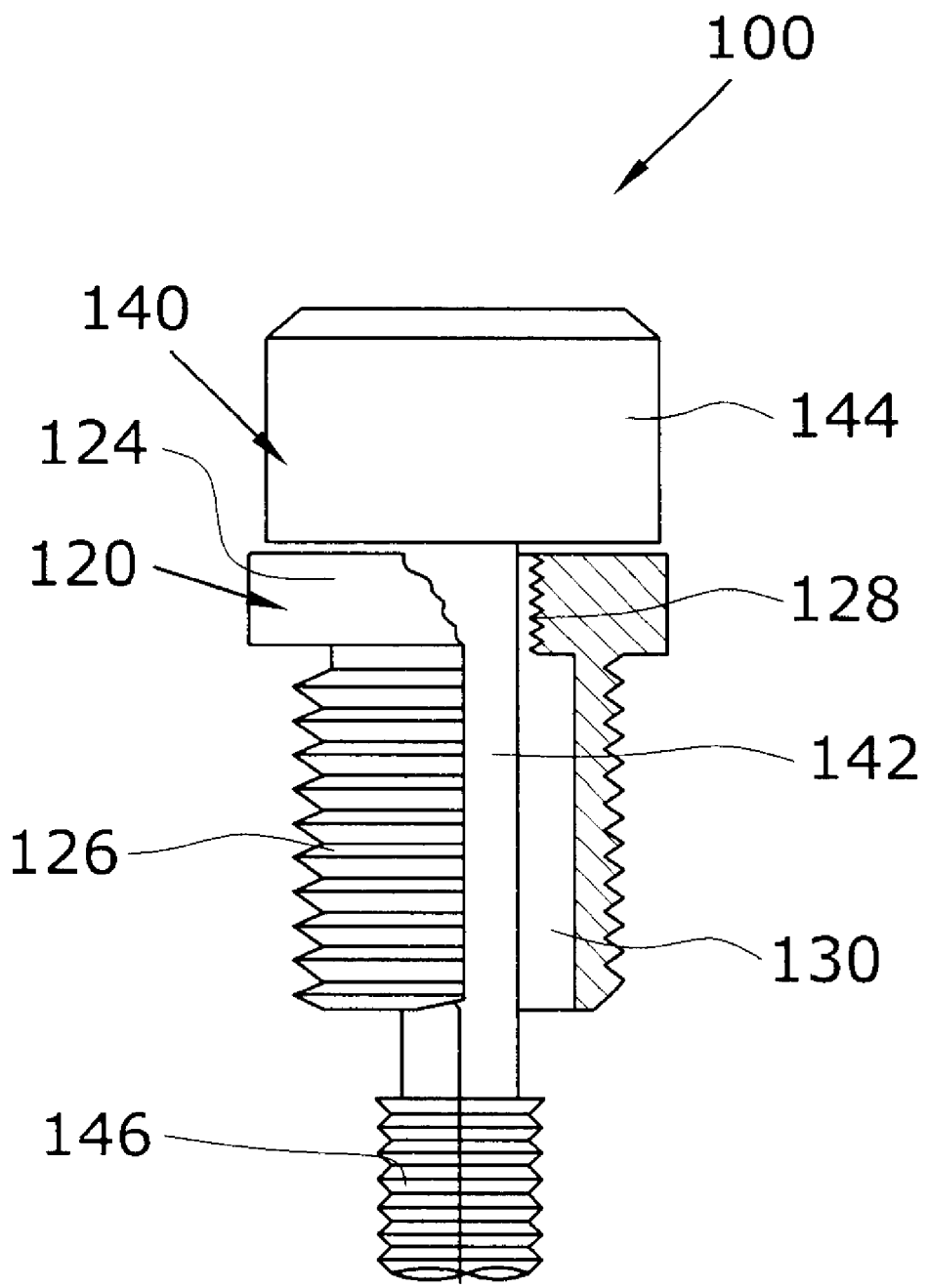
FIG. 9 is a partial cross-sectional view of the retaining mechanism of FIG. 7 showing a captivatable device in a captivated state.

By threading the threads 146 into the threaded bore 128, the captivatable device 140 is positioned in the retention device 130 in an installation state. Continued threading of the threads 146 through the threaded bore 128 results in captivation of the captivatable device 140, allowing a limited movement of the captivatable device 140 within the retention device 130. Specifically, in its captivated state, the captivatable device 140 may move from its head 144 contacting the retention device head 124 (FIG. 8) to the captivatable device threads 146 contacting the retention device head 124 (FIG. 9). To allow the limited movement, or float, of the captivatable device 140 in the retention device 130, the length of the threads 146 must be less than half of the entire length of the shank 142.

Figure 10:
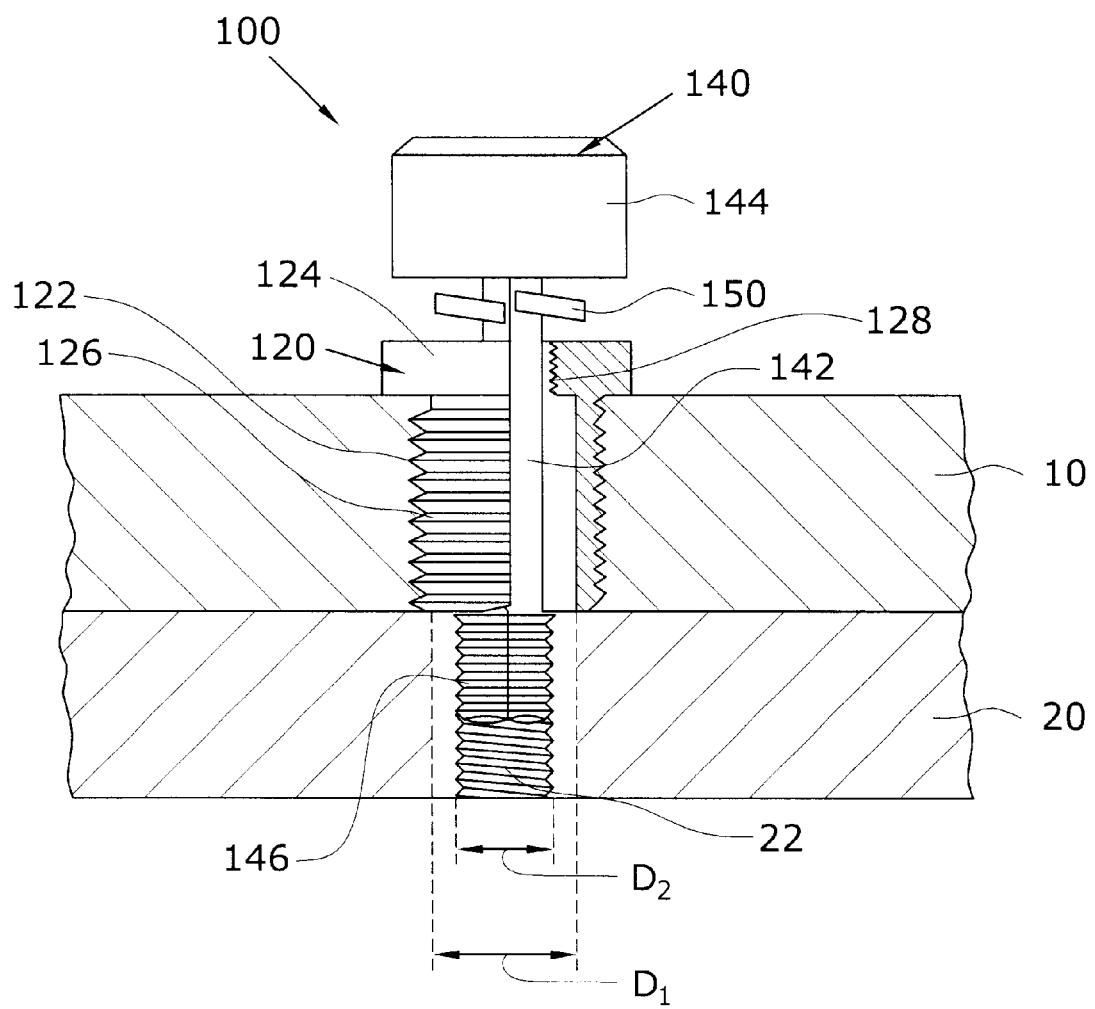
FIG. 10 is a partial cross-sectional view showing the retaining mechanism of FIG. 7 connecting a pair of structures.

Next, with specific reference to FIGS. 8–10, will be described the operation of the front mounted retaining mechanism 100. The retention device 120 is threaded into a first structure 10. Specifically, the threads 126 are threaded into a pre-threaded bore 12 of the first structure 10. After engagement of the retention device 120 and the first structure 10, the captivatable device 140 can be introduced into the retention device 120 as described above with reference to FIGS. 8 and 9.

An important facility of the front mounted retaining mechanism 100 is the ability to connect a pair of structures together without the need for specialized tools, without causing damage to the structures, and with the ability to disconnect the structures without further damaging them.

To connect a second structure 20 to the first structure 10, a pre-threaded bore 22 is formed in the second structure 20. The pre-threaded bore 22 should have a diameter $D_2$ and a thread width and pitch sufficient to receive and engage with the threads 146 of the captivatable device 140. With the captivatable device 140 captivated in the retention device 120, it is a relatively easy matter to line up and engage the threads 146 with the bore 22, thereby connecting the first and second structures 10, 20.

Disconnection of the structures 10, 20 may be easily accomplished by merely removing the captivatable device 140 using a conventional screw driver or other conventional tool.

Figure 11:
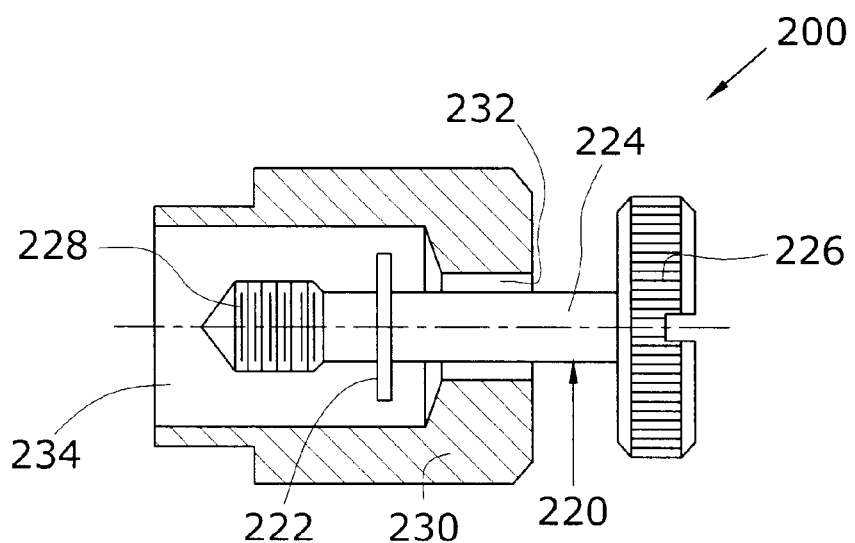
FIG. 11 is a partial cross-sectional view of a retaining mechanism constructed in accordance with another embodiment of the invention.

The front mounted retainer of the invention may take different forms than the front mounted retaining mechanism 100 described with reference to FIGS. 7–10. Specifically, and with reference to FIG. 11, a front mounted retaining mechanism 200 is shown. Unlike the retaining mechanism 100, the retaining mechanism 200 does not utilize a threaded retention device, but instead uses a captive panel 230 which is punched into a first structure, such as the structure 10 (FIG. 10). A captivatable device 220 includes a retainer ring 222 which is positioned on a shank 224 of the captivatable device 220 between a head 226 and threads 228. As shown, the retainer ring 222 has a greater diameter than an opening 232 in the captive panel 230. The shank 224 extends through the opening 232 into a cavity 234 of the captive panel 230, and the captivatable device 220 is movable from a first position where the retainer ring 222 contacts the captive panel 230 to a second position where the head 226 contacts the captive panel 230.

Figure 12:
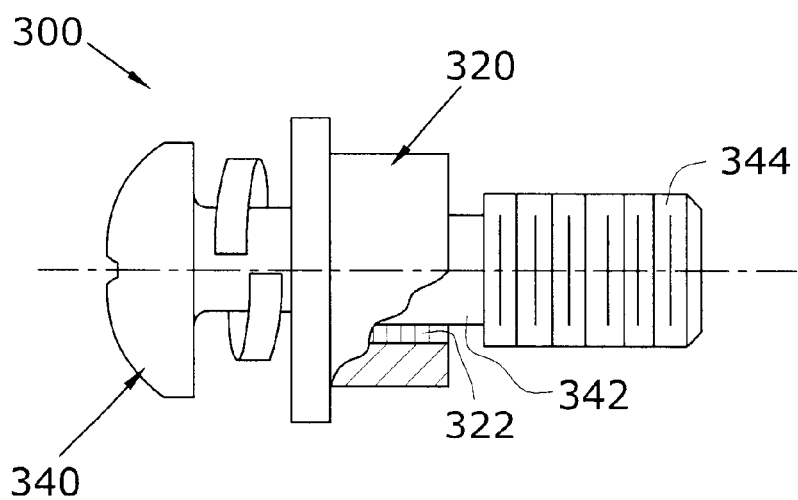
FIG. 12 is a partial cross-sectional view of a retaining mechanism constructed in accordance with another embodiment of the invention.

Alternatively, and as shown in FIG. 12, a front mounted retaining mechanism 300 is illustrated. The retaining mechanism 300 includes a threaded retention device 320 that includes only internally directed threads 322 and not externally directed threads. As with the captive panel 230, the retention device 320 is punched into a first structure. A captivatable device 340, having threads 344 at an end of a shank 342, threads into the internally directed threads of the retention device 320. By threading past the internally directed threads of the retention device 320, the captivatable device 340 is captivated within the retention device 320 since the diameter of the shank 342 is less than the inner diameter of the retention device threads 322.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A removable front mounted retaining mechanism, comprising:
   a retention device adapted for being anchored within a first structure, said retention device including a shank and a head with inwardly directed threads; and
   a captivatable device capable of floating within said retention device in a first position and adapted for being introduced to a second structure in a second position, wherein said retaining mechanism is removable from said first and second structures.

2. The removable front mounted retaining mechanism of claim 1, wherein said inwardly directed threads have a first diameter and said shank of said retention device includes a bore having a second diameter, said first diameter being less than said second diameter.

3. The removable front mounted retaining mechanism of claim 2, wherein said captivatable device comprises a head at one end of a shank and threads at another end of said shank.

4. The removable front mounted retaining mechanism of claim 3, wherein said threads of said captivatable device are sized and configured to mesh with said threads of said head of said retention device.

5. The removable front mounted retaining mechanism of claim 1, wherein said shank of said retention device includes outwardly directed threads.

6. The removable front mounted retaining mechanism of claim 1, wherein said captivatable device comprises a head at one end of a shank and threads at another end of said shank.

7. The removable front mounted retaining mechanism of claim 6, wherein said threads of said captivatable device are sized and configured to mesh with said threads of said shank of said retention device.

8. The removable front mounted retaining mechanism of claim 1, wherein said retention device includes an opening and a cavity, said opening extending from an end of said retention device to said cavity, said cavity having a greater diameter than said opening; and a captivatable device capable of floating within said retention device in a first position and for being introduced to a second structure in a second position.

9. The removable front mounted retaining mechanism of claim 8, wherein said captivatable device comprises:
   a head;
   a shank extending from said head and having threads at an end opposite from said head; and
   a retainer ring encircling said shank at a position between said threads and said head.

10. The removable front mounted retaining mechanism of claim 9, wherein said shank of said captivatable device extends through said opening such that said retainer ring and said threads of said captivatable device are positioned in said cavity.

11. A retaining system, comprising:
   a first structure having a first opening with a first diameter, wherein said first opening comprises threads;
   a second structure having a second opening with a second diameter that is less than said first diameter; and
   a removable front mounted retaining mechanism, comprising:
      a retention device adapted for being anchored within said first opening of said first structure, said retention device comprising a head with inwardly directed threads and a shank with outwardly directed threads sized and configured to be received in said first opening threads; and
      a captivatable device capable of floating within said retention device in a first position and adapted for being introduced to said second opening of said second structure in a second position.

12. The retaining system of claim 11, wherein said captivatable device comprises a shank having threads at an end thereof, said threads of said captivatable device being sized and configured to mesh with said threads of said head of said retention device.

13. The retaining system of claim 12, wherein said second opening comprises threads, said captivatable device threads being sized and configured to mesh with said threads of said second opening.

14. The retaining system of claim 11, wherein said retention device includes an opening and a cavity, said opening extending from an end of said retention device to said opening, said retention device opening having a greater diameter than said cavity.

15. The retaining system of claim 14, wherein said captivatable device comprises:
   a head;
   a shank extending from said head and having threads at an end opposite from said head; and
   a retainer ring encircling said shank at a position between said threads and said head.

16. The retaining system of claim 15, wherein said shank of said captivatable device extends through said opening such that said retainer ring and said threads of said captivatable device are positioned in said cavity.

17. A method of connecting a first structure to a second structure, comprising:
   providing a first structure with a first opening having a first diameter, wherein the first opening has threads;
   providing a second structure with a second opening having a second diameter smaller than the first diameter of the first opening;
   introducing a retention device having threads into the first opening of the first structure, wherein said introduction comprises meshing the threads of the retention device with the threads of the first opening of the first structure;
   introducing a captivatable device into the retention device, said captivatable device being capable of floating within the retention device in a first position;
   aligning the first opening of the first structure with the second opening of the second structure; and
   introducing the captivatable device into the second opening of the second structure, thereby connecting the first and second structures.

18. The method of claim 17, wherein said introducing the retention device into the first opening of the first structure comprises punching the retention device into the first opening.

* * * * *